(12) United States Patent
Egan et al.

(10) Patent No.: US 12,004,446 B2
(45) Date of Patent: Jun. 11, 2024

(54) FOLDING REAR CROSS SYSTEM

(71) Applicants: Jordan Egan, Pocatello, ID (US); James Yearsly, Pocatello, ID (US)

(72) Inventors: Jordan Egan, Pocatello, ID (US); James Yearsly, Pocatello, ID (US)

(73) Assignee: Spudnik Equipment Company LLC, Blackfoot, ID (US)

( * ) Notice: Subject to any disclaimer, the term of this patent is extended or adjusted under 35 U.S.C. 154(b) by 730 days.

(21) Appl. No.: 16/999,478

(22) Filed: Aug. 21, 2020

(65) Prior Publication Data
US 2022/0053690 A1    Feb. 24, 2022

(51) Int. Cl.
*A01D 33/00* (2006.01)
*A01B 73/04* (2006.01)
*A01D 17/10* (2006.01)
*A01D 57/20* (2006.01)

(52) U.S. Cl.
CPC ............ *A01D 33/00* (2013.01); *A01B 73/044* (2013.01); *A01D 17/101* (2013.01); *A01D 57/20* (2013.01); *A01D 2017/103* (2013.01)

(58) Field of Classification Search
CPC ........ A01D 17/10; A01D 84/00; A01D 33/00; A01D 17/101; A01D 2017/103; A01D 57/20; A01D 41/144; A01D 78/1014; A01D 33/14; A01B 73/044; B65G 41/002; B65G 41/008; B65G 21/14
USPC ...................... 198/581, 584, 861.5
See application file for complete search history.

(56) References Cited

U.S. PATENT DOCUMENTS

| | | | | |
|---|---|---|---|---|
| 1,946,656 A | * | 2/1934 | Lindgren | A01D 41/1243 56/122 |
| 2,666,518 A | * | 1/1954 | Page, Jr. | A01D 43/077 56/192 |
| 3,034,635 A | * | 5/1962 | Starr | A01D 46/243 198/313 |
| 3,214,002 A | * | 10/1965 | Kirkpatrick | A01D 57/20 56/192 |
| 3,279,158 A | * | 10/1966 | Kirkpatrick | A01D 34/032 56/228 |
| RE29,121 E | | 1/1977 | Hook et al. | |
| 4,119,193 A | * | 10/1978 | Smith | A01K 5/0208 198/577 |
| 4,429,517 A | * | 2/1984 | Lohrentz | A01D 57/20 56/192 |
| 4,519,190 A | * | 5/1985 | Blakeslee | A01D 57/20 56/192 |

(Continued)

FOREIGN PATENT DOCUMENTS

JP    08051829 A    2/1996

*Primary Examiner* — Thomas B Will
*Assistant Examiner* — Julia C Tran
(74) *Attorney, Agent, or Firm* — Progress Patent Law, P; David R. McKinney

(57) ABSTRACT

A folding rear cross system for a harvesting device having a harvesting direction and a discharge includes first and second substantially linearly aligned reversible endless belt sections, positioned near the discharge and oriented transverse to the harvesting direction. Each belt section has an inboard end disposed in overlapping relationship with the inboard end of the other. A lifting device is attached to selectively lift and lower the first and second reversible endless belt sections to reverse the overlapping relationship.

20 Claims, 6 Drawing Sheets

(56) References Cited

U.S. PATENT DOCUMENTS

| | | | | |
|---|---|---|---|---|
| 4,976,094 | A * | 12/1990 | Williamson | A01D 46/28 |
| | | | | 198/313 |
| 5,177,944 | A * | 1/1993 | Finlay | A01D 84/00 |
| | | | | 56/370 |
| 5,301,496 | A * | 4/1994 | Sudbrack | A01D 57/20 |
| | | | | 56/366 |
| 5,974,774 | A * | 11/1999 | Peachey | A01D 57/20 |
| | | | | 56/372 |
| 6,205,757 | B1 * | 3/2001 | Dow | A01D 57/20 |
| | | | | 56/366 |
| 7,789,166 | B2 | 9/2010 | Wallace | |
| 8,033,340 | B2 | 10/2011 | Majkrzak | |
| 10,039,227 | B2 | 8/2018 | Dettmer et al. | |
| 2005/0126153 | A1 * | 6/2005 | Hironimus | A01D 84/00 |
| | | | | 56/354 |
| 2008/0283364 | A1 * | 11/2008 | Laganiere | A01D 57/20 |
| | | | | 198/581 |
| 2011/0024139 | A1 * | 2/2011 | Majkrzak | A01D 17/10 |
| | | | | 171/23 |
| 2015/0020492 | A1 * | 1/2015 | Schwer | A01D 84/00 |
| | | | | 56/377 |
| 2016/0050845 | A1 | 2/2016 | Nilson et al. | |

\* cited by examiner

US 12,004,446 B2

FOLDING REAR CROSS SYSTEM

BACKGROUND

Field of the Invention

The present invention relates generally to agricultural apparatus for discharging harvested items into a windrow behind a harvesting device. More particularly, the present invention provides a foldable rear cross system that can selectively discharge the harvested items (e.g. potatoes) to one or the other side behind the harvesting device.

Related Art

In harvesting agricultural products, such as potatoes, beets and other root crops, it is often desirable to discharge the products onto the ground in a "windrow" that trails behind the harvester. This can be done with a conveyor device oriented transverse to the travel direction of the harvester. This device is called a "rear cross," and discharges the harvested products to one side or the other of the harvester as the harvester progresses through the field.

When using a rear cross, it is desirable to be able to select whether the system discharges to the left or the right. Thus, a reversible rear cross is desired, though existing known reversible rear cross devices tend to be inflexible in various ways. Additionally, it is desirable to maximize the width of the harvester (and thus of the rear cross) while also being able to transport the device on roadways. Current rear cross devices tend to present difficulties with regard to these various issues.

The present application seeks to address one or more of these and other issues.

SUMMARY

It has been recognized that it would be advantageous to have a reversible rear cross device for a harvester that has a maximum useable width, while still being easily moveable on roadways.

It has also been recognized that it would be advantageous to have a rear cross device for a harvester that is easily transitioned from one output direction to the other.

In accordance with one embodiment thereof, the present invention provides a foldable rear cross system for a harvesting device having a harvesting direction and a discharge. The foldable rear cross system includes first and second substantially linearly aligned reversible endless belt sections, positioned near the discharge and oriented transverse to the harvesting direction. Each belt section has an inboard end disposed in overlapping relationship with the inboard end of the other. A lifting device is attached to selectively lift and lower the first and second reversible endless belt sections to reverse the overlapping relationship.

In accordance with another aspect thereof, the invention provides a root crop harvester, including a foldable frame, having wheels, configured to be moved upon ground in a harvesting direction, a foldable crop extracting mechanism, having a discharge, attached to the frame, and a foldable rear cross conveyor mechanism, oriented generally transverse to the harvesting direction, positioned to receive harvested crops from the discharge and transport and discharge the harvested crops laterally. The foldable rear cross further includes first and second reversible endless belt devices, each having an inboard end and an outboard end and disposed end-to-end near the discharge, the inboard ends being disposed in an overlapping relationship, and a folding device, configured to selectively lift and fold the frame, the crop extracting mechanism and the rear cross conveyor mechanism to a raised position, wherein the overlapping relationship of the first and second endless belt devices can be reversed.

In accordance with yet another aspect thereof, the invention provides a foldable rear cross system for a harvesting device having a harvesting direction and a discharge. The foldable rear cross system includes first and second moveable frame sections, supporting first and second reversible endless belt devices, respectively, oriented generally transverse to the harvesting direction, positioned to receive harvested crops from the discharge and transport and discharge the harvested crops laterally. The endless belt devices each have an inboard end and an outboard end and are disposed end-to-end near the discharge, the inboard ends being disposed in an overlapping relationship. A lifting mechanism is attached to selectively lift and lower the first and second moveable frame sections, to allow reversal of the overlapping relationship.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
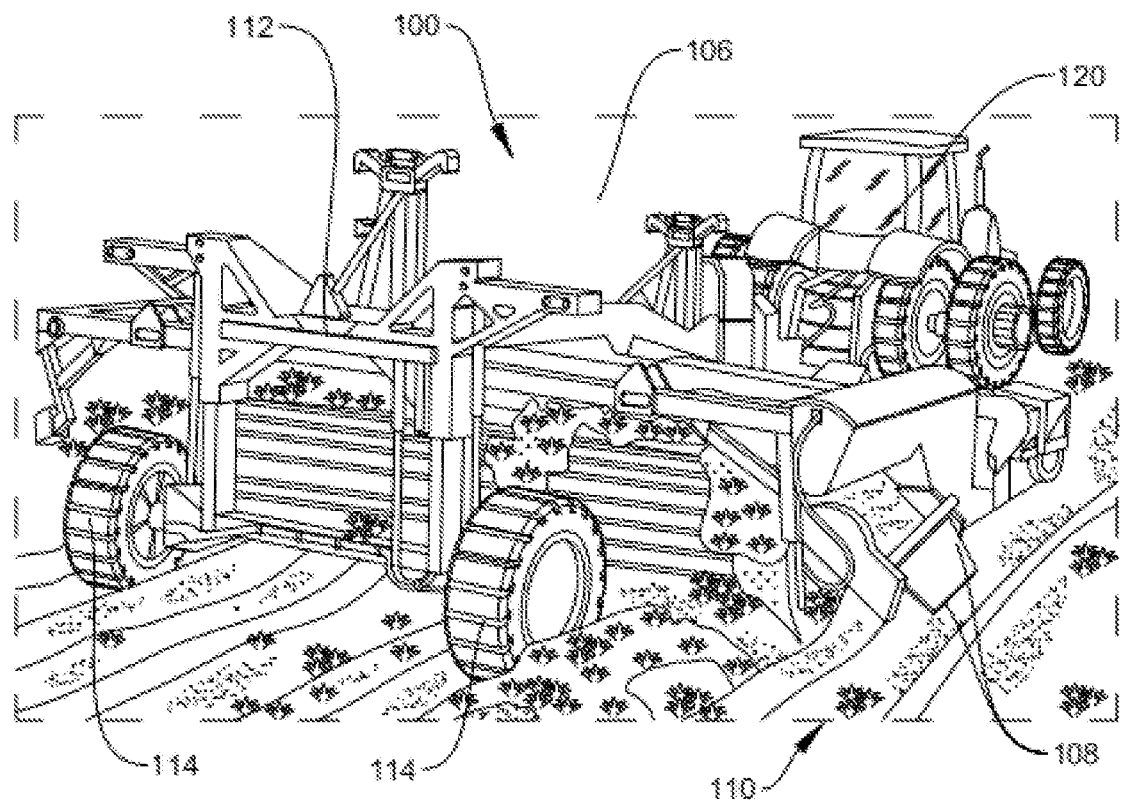
FIG. 1 is a rear perspective view of a harvester having a foldable rear cross in accordance with the present disclosure.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, positional and directional terms, such as "forward," "backward," "front," "back," "top," "bottom," "above," "below," "in," "out," "up," "down," and the like, are to be interpreted relative to the respective illustrations in the drawings. These terms have specific reference to directions relative to the drawings, and are used for the purpose of description in connection with the drawings only, and do not necessarily indicate a specific direction, position or orientation relative to any other thing or any other positional or directional reference system, unless otherwise indicated. Those of skill in the art will recognize that the apparatus described herein may be used or described in a variety of orientations in which positional and directional terms could be used differently. It is also to be understood that the terms "rear cross," "rear cross system," "rear cross conveyor" and "rear cross conveyor system" are used interchangeably herein to refer to the overall foldable rear cross system disclosed herein.

As noted above, the present disclosure provides an agricultural conveyor for harvesters and the like, which has a reversible lateral discharge direction. More particularly, the foldable rear cross system disclosed herein provides a lateral discharge conveyor system having multiple sections that can be selectively interleaved to allow changing the direction of lateral discharge. Additionally, the multiple sections of the rear cross (and of the harvester generally) are hingedly connected to the vehicle frame, allowing the rear cross to be folded upward for transport on roadways.

Figure 2:
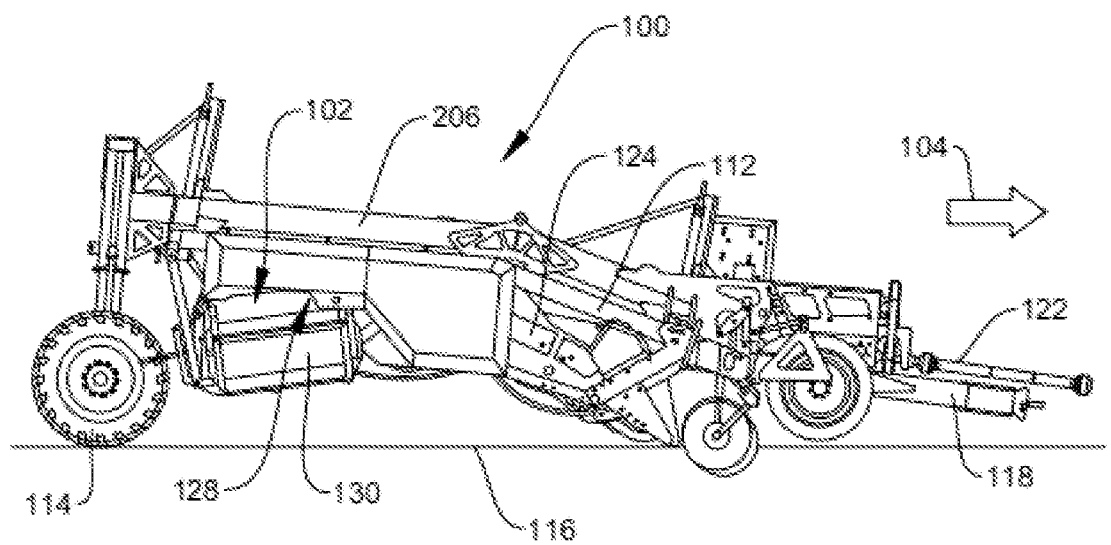
FIG. 2 is a side view of the harvester and foldable rear cross of FIG. 1.
Figure 3:
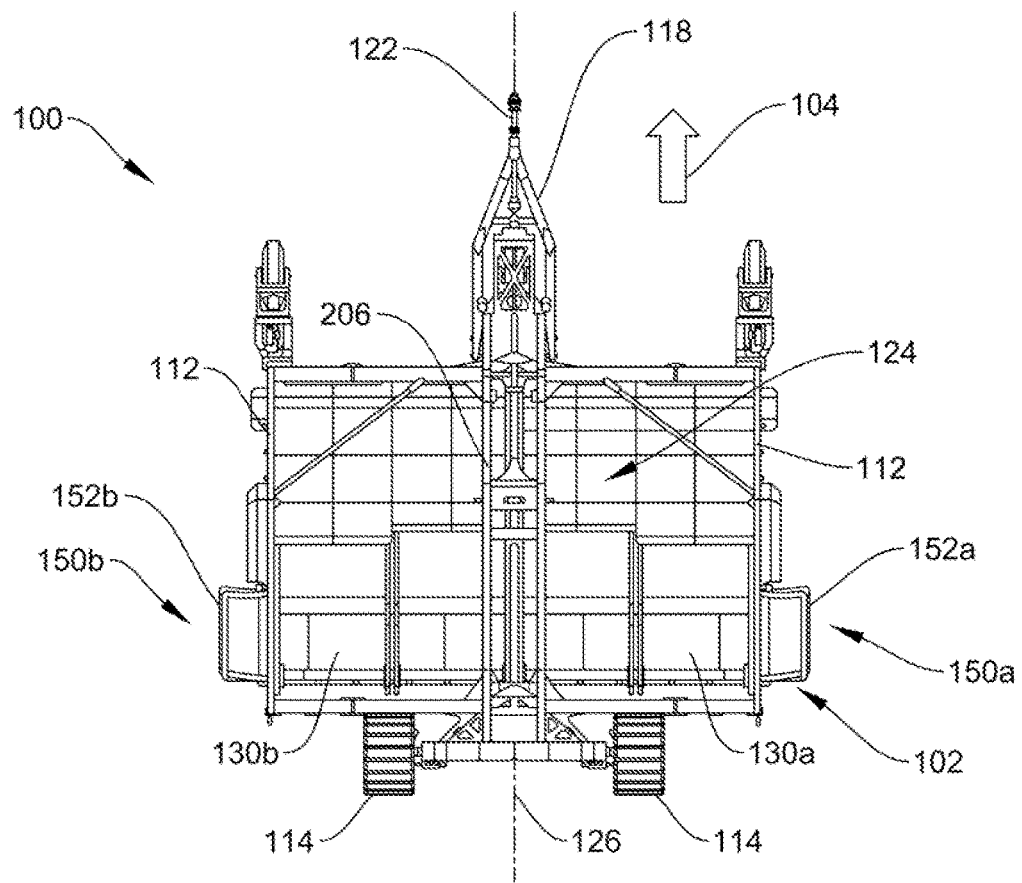
FIG. 3 is a top view of the harvester of FIGS. 1 and 2.

Shown in FIG. 1 is a rear perspective view of a harvester 100 having a foldable rear cross system, indicated generally at 102, in accordance with the present disclosure. Shown in FIGS. 2 and 3 are side and top views, respectively, of the harvester 100 of FIG. 1. In FIG. 1 the harvester 100 is being towed in a harvesting direction (indicated by arrow 104 in FIG. 3) in a field 106 and discharging harvested root crops 108 into a windrow 110 to the side of the harvester 100. The harvester 100 generally includes a frame 112, with rear wheels 114 for supporting the frame 112 upon the ground 116, with a hitch or drawbar 118 for attachment to a towing vehicle, such as a tractor (120 in FIG. 1). The harvester 100 can also include a power take-off 122 for transmitting operational power from the towing vehicle 120 to the harvester 100.

The harvester frame 112 supports a crop harvesting mechanism 124, such as a root crop harvesting device for harvesting potatoes or other root crops, though it is to be appreciated that this is only one type of harvesting device. Other types of harvesting mechanisms can also be provided with a foldable rear cross in accordance with the present disclosure. In FIGS. 1-3 the harvester 100 is foldable. That is, the frame 112 and the crop harvesting mechanism 124 include first and second (e.g. right side and left side) moveable frame sections 112a, 112b, that are hingedly connected together generally along the centerline, as indicated at 126 in FIG. 3, allowing the right and left halves of the harvester 100 to be folded upward as disclosed herein.

The harvester mechanism 124 includes a discharge 128 toward the rear of the harvester 100, where harvested products 108 are deposited onto a conveyor belt 130 of the foldable rear cross system 102. The harvester 100 thus has a harvesting or operating direction, indicated by arrow 104, and a discharge 128, with the rear cross 102 positioned at the discharge 128 and oriented generally transverse to the harvesting direction 104. As shown in FIG. 2, the rear cross conveyor 102 can be rearwardly tilted, to assist the harvested product 108 in moving from the discharge location 128 onto the rearward portion of the rear cross conveyor belt 130, so as not to block the discharge 128.

Figure 4:
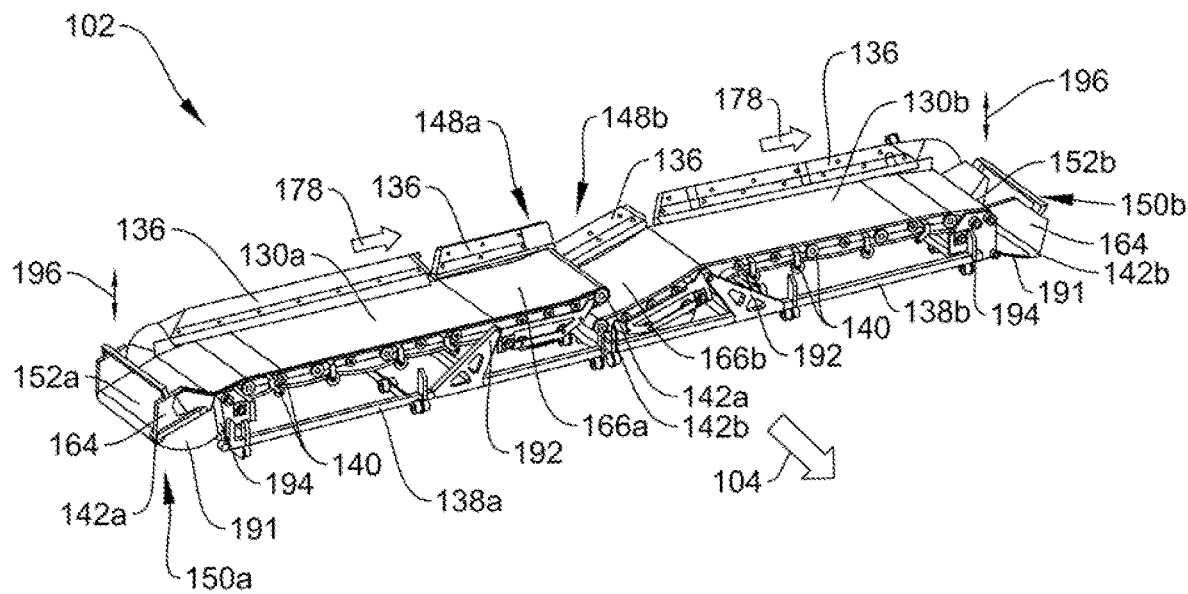
FIG. 4 is a front perspective view of one embodiment of a folding rear cross system in accordance with the present disclosure, with the inboard tip-downs positioned for rightward discharge.
Figure 5:
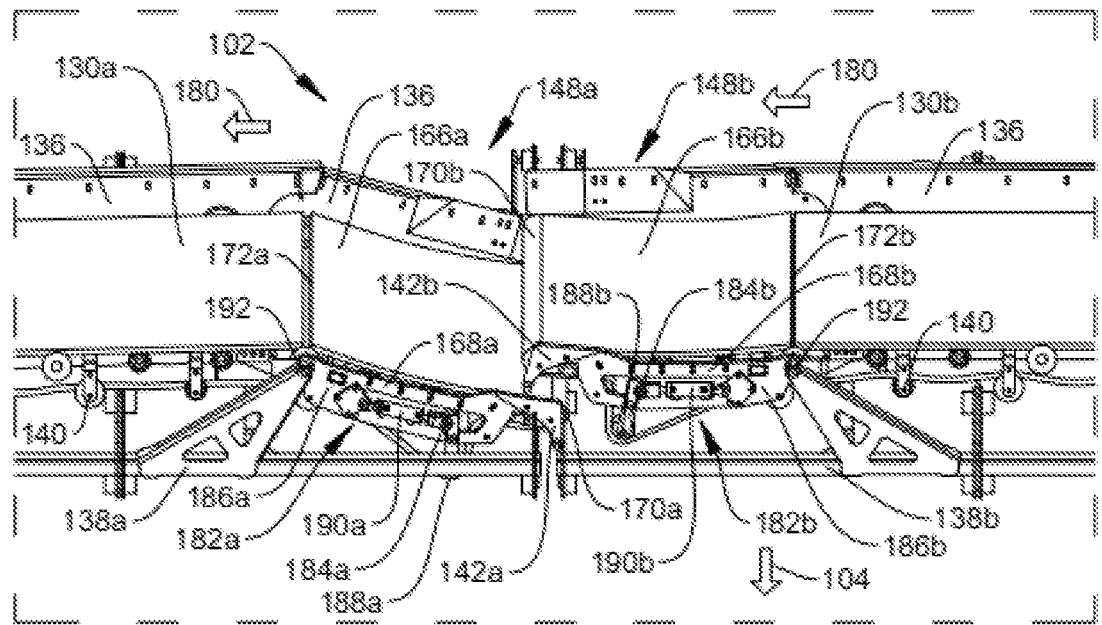
FIG. 5 is a close-up front view of a folding rear cross like that of FIG. 4, with the inboard tip-downs positioned for leftward discharge.

A rear perspective view of one embodiment of a folding rear cross system 102 in accordance with the present disclosure, separated from the harvesting vehicle 100 for clarity, is shown in FIG. 4. A close-up rear view of the central portion of the folding rear cross 102 is shown in FIG. 5. The foldable rear cross system 102 generally includes first and second substantially linearly aligned reversible endless belt sections 130a, b, disposed end-to-end near the discharge 128 of the harvester 100 and oriented transverse to the harvesting direction 104. The first and second belt sections 130a, b are positioned to receive harvested crops 108 from the discharge 128, and to transport and discharge the harvested crops 108 laterally to one side or the other of the harvester 100. The belt sections 130a, b can employ a solid endless belt of flexible rubber or the like, as shown in the figures, or they can employ a chain or belted chain. Chain conveyors and belted chains, which include a series of transverse bars linked together in a flexible endless belt that allows debris to fall between the bars, are well known in the agricultural industry.

As noted above, the rear cross system 102 can be rearwardly tilted to assist product 108 in moving away from the discharge 128. Additionally, as shown in FIGS. 4 and 5 particularly, the belt sections 130a, b can include an upward rear panel 136, extending along the entire length of the belt sections, to keep product 108 on the conveyor belts 130, and prevent product from dropping off the back of the rear cross conveyor 102.

Each endless belt section 130a, b is supported by a respective frame section 138a, b, and includes inboard and outboard return rollers 142a, b, respectively, at the inboard and outboard ends. Each belt section 130 also includes multiple idler rollers 140 supported by the respective frame section 138 for supporting the upper and lower portions of the belt 130 along its length between the return rollers 142 (FIGS. 4-5). Viewing FIG. 6, each belt section 130 is powered by a drive motor 144 having an output shaft that is connected to the shaft 146 of a drive roller or sprocket (not shown) of the respective belt section 130 by a drive belt or chain 147, or other mechanical transmission. The drive motor 144 can be a reversible electric or hydraulic motor, and provides driving power to the respective belt section 130 in either operational direction, as desired. It is to be appreciated that other mechanisms for driving the belt sections 130 can also be employed, such as a drive shaft connected to the power take-off 122 of the harvester unit 100.

Figure 6:
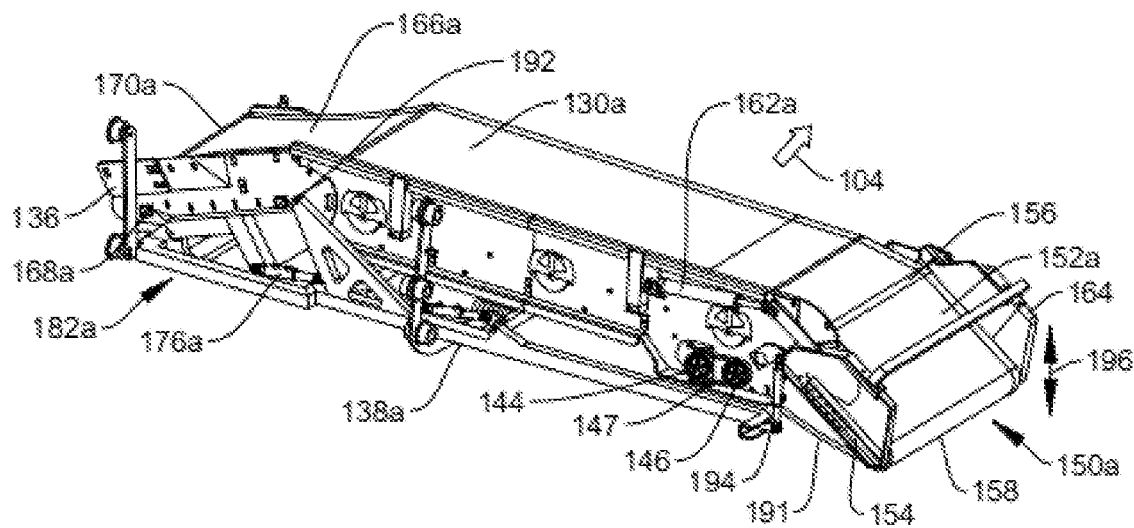
FIG. 6 is a rear view of one endless belt section of the folding rear cross of FIG. 5, showing components of the respective outboard tip-down and lateral tipping mechanisms.

As best shown in FIGS. 4-6, each belt section 130 has an inboard end 148a, b toward the center of the harvester mechanism 100, and an outboard end 150a, b disposed toward the respective outer side of the harvester device 100. The inboard ends 148 of the belt sections 130 are disposed in overlapping relationship with each other, as described below.

The inboard ends 148 and outboard ends 150 of each belt section have tip-down portions that pivot relative to the frame 138 of the respective belt section 130. Each outboard tip-down 152 includes a tip-down frame 154, having a proximal end 156 pivotally connected to the outboard end 150 of the respective frame section 138, and a distal end 158 supporting one of the outboard return rollers 142 for the respective belt section 130. Idler rollers (140 in FIGS. 4, 5) can also be attached to the outboard tip-down frame 154 to support the belt. As best seen in FIG. 6, an outboard tip-down actuation mechanism 162, such as a hydraulic actuator, is attached to each outboard tip-down frame 154, to enable the angular orientation of each outboard tip-down 152 to be independently controlled, as described below.

The distal ends 158 of the outboard tip-downs 152 can be independently raised or lowered depending on whether product is being discharged therefrom. For the outboard tip-downs 152, product 108 is either received from the central portion of the respective belt section 130 and conveyed toward the distal end 158 of the outboard tip-down for discharge to the side of the harvester 100, or, when the respective belt section 130 is conveying product away from that outboard end 150, the outboard tip-down 152 can be raised and not used. The lowered position of the outboard tip-downs 152 reduces the magnitude of vertical drop of the product (e.g. potatoes) to the ground, so as to provide more gentle handling of the product and reduce damage. In the raised position, the outboard tip-downs 152 help prevent product 108 from inadvertently falling from the outboard end 150 of the adjacent belt section 130. The outboard tip-downs 152 also include side panels 164, which keep product 108 on the tip-down belt until it reaches the discharge end 158.

Unlike the outboard tip-downs 152, which are away from each other, the inboard tip-downs 166 are positioned in an overlapping relationship at the inboard ends 148 of the belt sections 130 toward the center of the harvester 100. More specifically, when the harvester 100 is in a normal operating configuration, the inboard tip-down 166 of one of the first and second belt sections 130 is positioned above the inboard tip-down 166 of the other of the first and second belt sections 130, which facilitates product 108 being transferred from one belt section 130 onto the other, depending on the desired conveying direction.

Like the outboard tip-downs 152 discussed above, the inboard tip-downs 166 have relatively short pivotal frames 168, with a distal end 170 supporting one of the inboard return rollers 140 for the respective belt section 130, and a proximal end 172 that is pivotally connected to the respective frame section 138. Idler rollers (140 in FIGS. 4, 5) can also be attached to the inboard tip-down frame 168 to support the belt in the tip-down region. As best seen in FIG. 6, an inboard tip-down actuation mechanism 176 (e.g. a hydraulic actuator) is attached to each inboard tip-down frame 168, to enable the angular orientation of each inboard tip-down 166 to be independently controlled The inboard tip downs 166 are configured to either discharge product 108 from their distal end 170 to the adjacent belt section 130, positioned therebelow, or to receive product 108 that is discharged from the distal end 170 of the inboard tip-down 166 of the adjacent belt section 130, positioned thereabove. Whether a given inboard tip-down 166 is discharging or receiving product 108 depends upon the direction of operation of the respective belt sections 130, and which inboard tip-down 166 is positioned above the other. For example, in the image of FIG. 4, the inboard tip-downs 166 are configured for rightward motion (relative to this view) of the belt sections, as indicated by arrow 178, to provide rightward motion of the harvested product 108 and discharge via the rightward outboard tip-down 152a. For this mode of operation, the leftward inboard tip-down 166b is disposed above the rightward inboard tip-down 166a, so that product transported rightward on the first belt section 130b (on the left in FIGS. 4, 5) will drop onto the inboard tip-down 166a of the second belt section 130a, and continue to be transported rightward on that belt section toward the right outboard end 150a for discharge.

In the image of FIG. 5, on the other hand, the inboard tip-downs 166 are configured for leftward motion (relative to this view) of the belt sections 130, as indicated by arrow 180, to provide leftward motion of the harvested product 108 and discharge via the left outboard tip-down (152a in FIG. 4). For this mode of operation, the leftward inboard tip-down 166b is disposed below the rightward inboard tip-down 166a, so that product 108 transported leftward on the second belt section 130a will drop onto the inboard tip-down 166b of the first belt section 130b, and continue to be transported leftward on that belt section toward the left outboard end 150a for discharge.

As shown most clearly in FIG. 5, each belt section 130 includes a belt tensioning mechanism, indicated generally at 182, which in this embodiment is positioned at the respective inboard tip-downs 166, but could be located elsewhere. The belt tensioning mechanism 182 allows adjustment of the tension on the belt 130 depending on the positions of the various tip-downs 152, 166, and the work load on the belt 130, so as to maintain secure contact of the belt on the drive roller and other rollers. The belt tensioning mechanism 182 is disposed on the lower portion of the inboard tip-down frame 168, and includes a tensioning arm 184 that is pivotally connected to an extension 186 of the inboard tip-down frame 168, a tensioning roller 188 that is connected to one end of the tensioning arm 184 and in contact with the lower portion of the belt 130, and a belt tensioning actuator 190, connected to an opposite end of the tensioning arm 184. Extension or retraction of the tensioning actuator 190 will pivot the tensioning arm 184, which will change the position of the tensioning roller 188 and thus effectively modify the tension on the belt 130.

The belt tensioning mechanism 182 also allows the creation of a sag or "belly" in the surface of the belt section 130. As best seen in FIGS. 4 and 6, the tension on the belt 130, in combination with the relative position of the outboard tip-downs 152, can allow the belt to form a "belly" or sagging section 191 in the belt below the respective outboard tip-down. This "belly" 191 provides a region where foreign material and debris that is on the belt 130 fall out of the inside of the belt 130, whether the belt is a solid rubber-type belt or a chain or belted chain. Additionally, the rearward tilt of the rear cross system, discussed above, will also tend to urge debris to fall out of the sagging section 191 as the harvester 100 is in operation.

In addition to the tip-downs, each frame section 138 of the rear cross system 102 can also include a lateral tipping mechanism for selectively sloping the belt sections 130 toward the left or right discharge directions. This tipping mechanism is best shown in FIGS. 4-6. As shown, each belt section 130 is pivotally attached to its respective frame section 138 at a fixed inboard pivot point 192. The outboard end of the respective belt section 130 is attached to the frame section 138 via a lifting mechanism, such as a hydraulic lifting cylinder 194. Extension or retraction of the lifting cylinder 194 causes the outboard end of the respective belt section 130 to rise or fall, respectively, as indicated by arrows 196 in FIGS. 4 and 6. When the outboard end of the belt section 130 is lifted, the belt section will tip toward the inboard direction. When the outboard end of the belt section is lowered, it will tip toward the outboard tip-down. Since each belt section 130 includes its own lateral tipping mechanism, the direction and magnitude of lateral tipping can be independently controlled. The lateral tipping mechanism provides more vertical room for product on the conveyor belt toward the discharge end, where product accumulation is greatest during operation. For example, when discharging to the right, the rightward end of the rightward belt section 130 is lowered to slope that belt toward the right to give more vertical space for product.

As shown in FIGS. 7-10 the folding rear cross system 102 disclosed herein includes a lifting device, indicated generally at 200, that is configured to selectively lift and lower the first and second frame sections 138. This allows the first and second reversible endless belt sections 130 to be raised to a position in which the overlapping relationship of the inboard ends 148 of these belts and their respective inboard tip-downs 166 can be reversed. The lifting device 200 and its operation for reversal of the overlapping relationship are illustrated in FIGS. 6-9, which provide rear views of the folding rear cross system 102 installed on the harvester frame 112. It is to be understood that the views of FIGS. 4-5 are from the opposite perspective of the views of FIGS. 6-9. That is, the views of FIGS. 4-5 are of the forward side of the rear cross system 102, as indicated by the arrow 104 showing the harvesting or operational direction, while the views of FIGS. 6-9 are of the rear of the rear cross system 102, as also indicated by the arrow 104 showing the harvesting or operational direction in FIG. 7.

Figure 7:
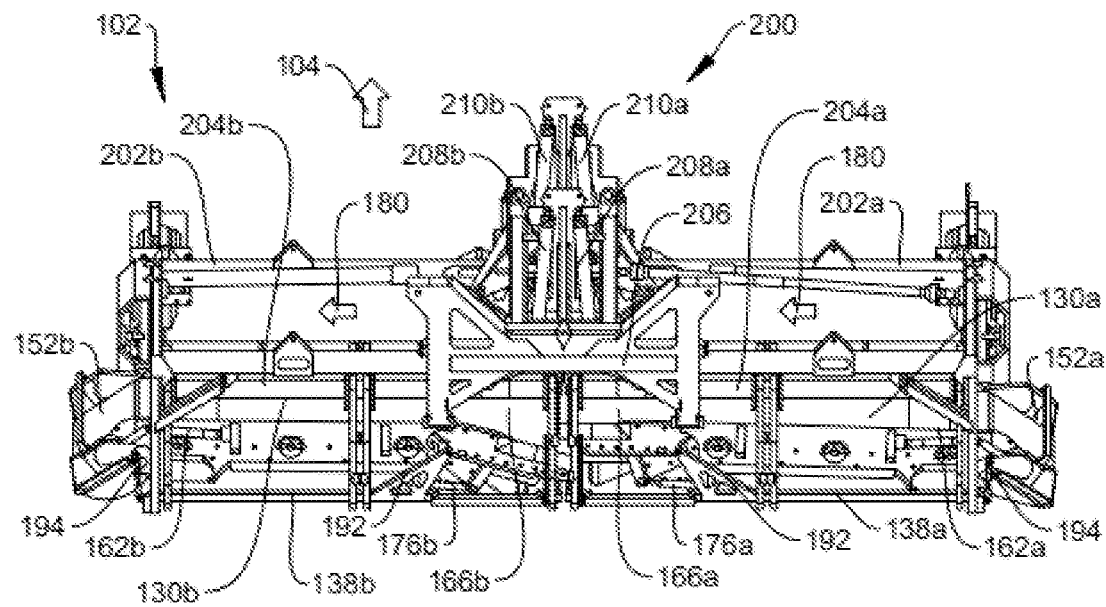
FIG. 7 is a rear view of the folding rear cross of FIGS. 4 and 5 installed on a harvester frame in the operational position, configured for leftward discharge of harvested product.

Referring to FIG. 7, the endless belt sections 130 each include a forward upper frame 202 and a rearward upper frame 204, which are attached to the first and second frame sections 138*a, b*, respectively. These upper frames 202, 204 are pivotally attached to an overhead portion 206 of the harvester frame 112, which is disposed above the belt sections 130 of the folding rear cross 102, at a generally inboard location on the upper frames 202, 204. The lifting device 200 includes a first pair of lifting actuators 208, such as hydraulic cylinders, which are attached between the overhead portion 206 of the harvester frame 112 and the inboard end of the rearward upper frame 204. A second pair of lifting actuators 210 are attached between the overhead portion 206 of the harvester frame 112 and the inboard end of the forward upper frame 202. Extension of the first and second pairs of lifting actuators 208, 210 pushes downward on the inboard ends of the upper frames 202, 204, causing the outboard ends 150 of the respective belt sections 130 to rotate upward, and the inboard ends 148 of the belt sections 130 to rotate away from each other and slightly downward. This lifting operation allows reversal of the inboard tip-down orientation to facilitate reversal of the belt direction, and also allows configuring the harvester for transport on a roadway.

The process of changing the overall discharge direction of the rear cross system 102 is illustrated in FIGS. 6-9. In FIG. 7 the inboard tip-downs 166 are configured for leftward discharge of harvested product, as indicated by arrows 180, with the rightward inboard tip-down 166*a* disposed above the leftward inboard tip-down 166*b*. It will be apparent that, in this position, the overlapping orientation of the inboard tip-downs 166 cannot be reversed simply by actuating the tip-downs themselves, because the inboard tip-downs 166 mechanically block each other. Instead, to allow reversal of the inboard tip-downs 166, the lifting actuators 208, 210 are extended to pivot the first and second frame sections 138 to the position shown in FIG. 8.

In this position, the outboard ends 150 of the belt sections 130 are rotated and raised in the direction of arrows 214, and the inboard ends 148 are separated and slightly lowered.

Figure 9:
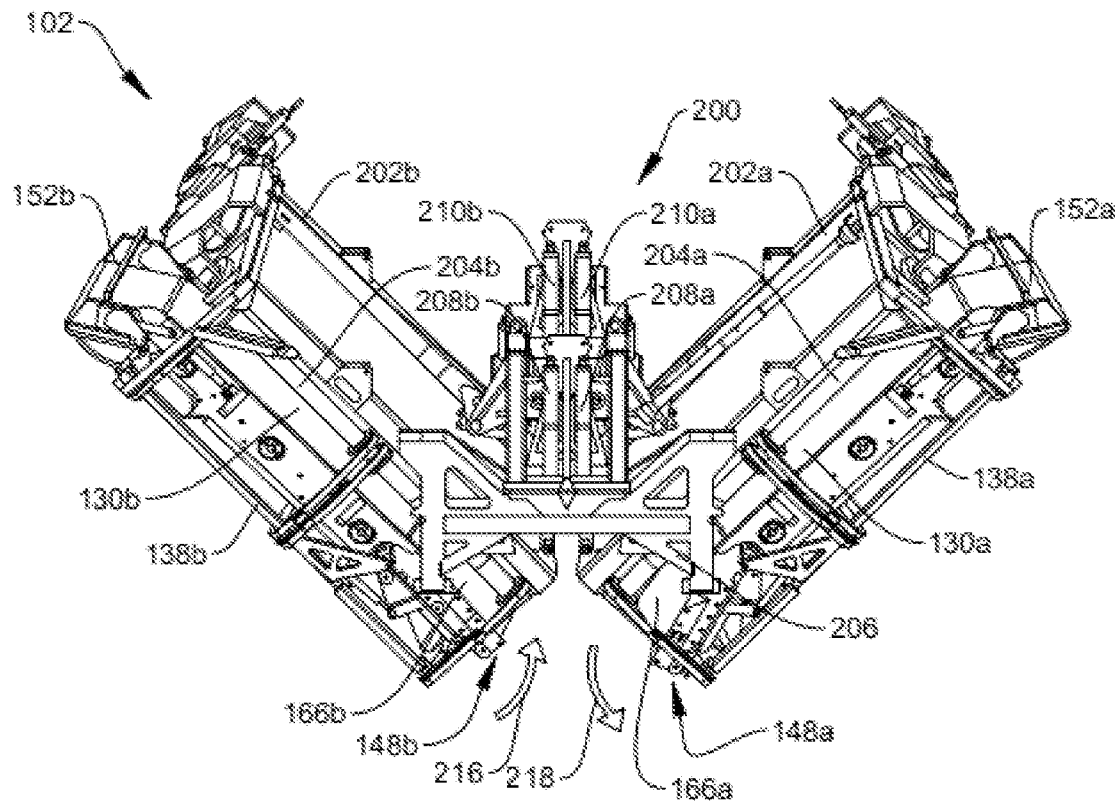
FIG. 9 is a rear view similar to FIG. 8, indicating the motion of the inboard tip-downs for reversal of the interleaving of the inboard tip-downs.
Figure 10:
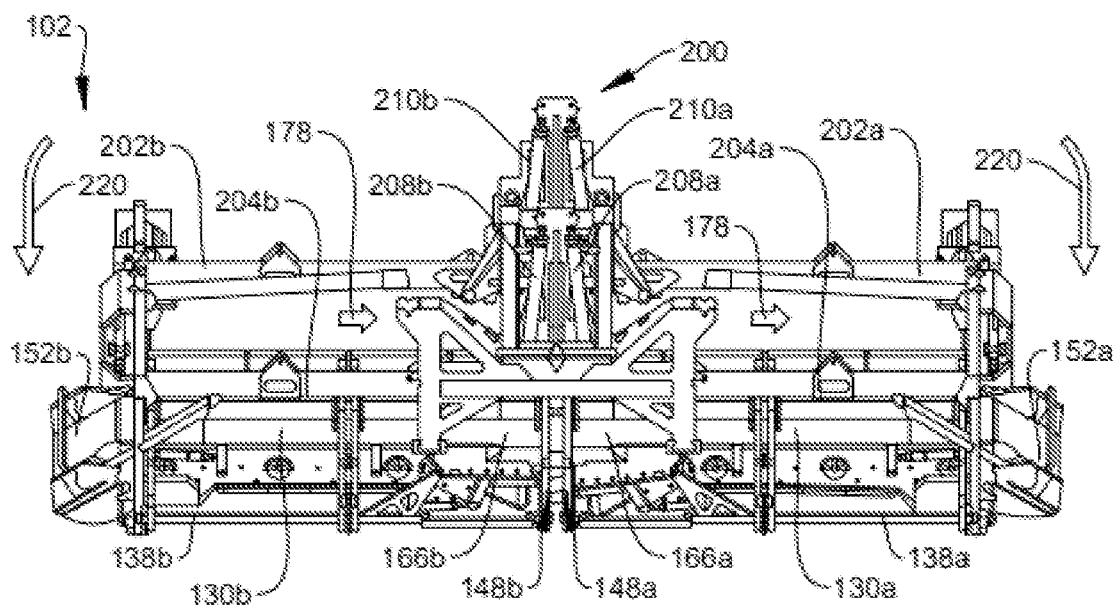
FIG. 10 is a rear view similar to FIG. 7, showing the rear cross folded down into the operational position and configured for rightward discharge of harvested product following the reversal steps of FIGS. 7 and 8.

Consequently, the inboard tip-downs 166 no longer mechanically interfere with each other. As shown in FIG. 9, the rightward inboard tip-down 166*a* can then be rotated downward, as indicated by arrow 216, and the leftward inboard tip-down 166*b* can be rotated upward, as indicated by arrow 218. After this adjustment, the lifting actuators 208, 210 are retracted so that the frame halves 138 of the rear cross 102 are again lowered, to the position shown in FIG. 10, as indicated by arrows 220. When returned to this operational configuration, the inner tip-downs 166 will overlap in an opposite manner from the configuration of FIG. 7. That is, in the configuration of FIG. 10, the leftward inboard tip-down 166*b* is now disposed above the rightward inboard tip-down 166*a*, so as to facilitate reversing the direction of the conveyor belts of the respective belt sections to change the discharge direction to the right, as indicated by arrow 178. It is to be appreciated that after adjustment of the overlapping relationship of the inboard tip-downs 166, it is typically desirable to adjust the belt tensioning mechanisms 182 to provide proper belt tension for subsequent operations.

Figure 8:
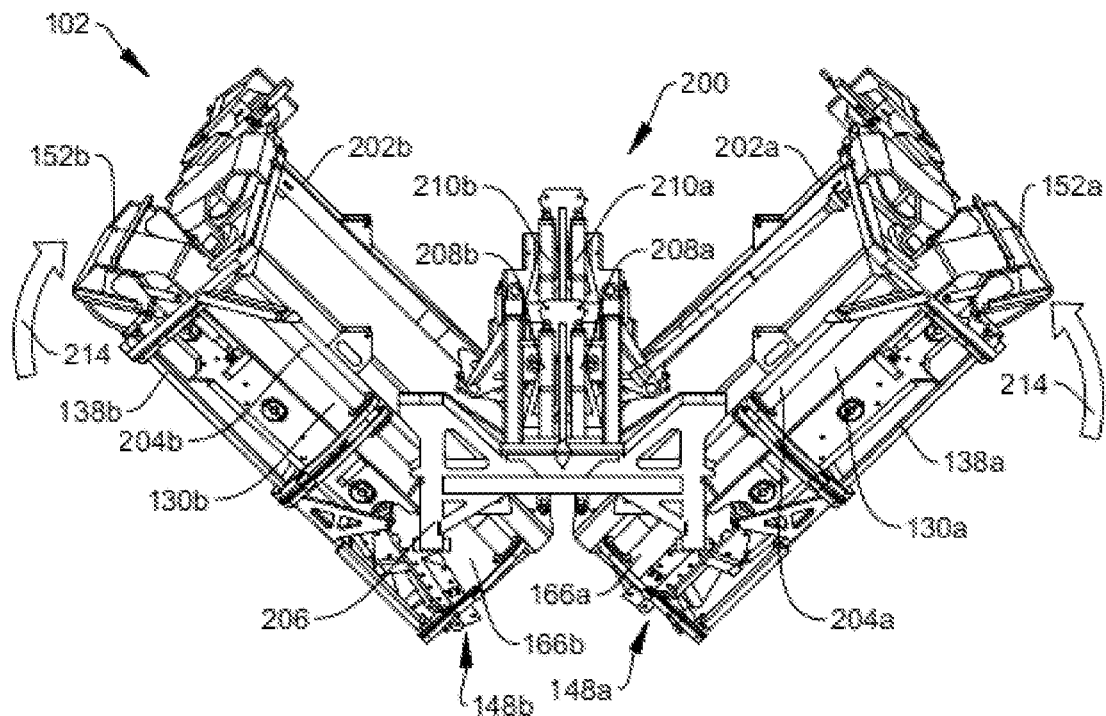
FIG. 8 is a rear view similar to FIG. 7, with the rear cross folded up to allow reversal of the interleaving of the inboard tip-downs.
Figure 11:
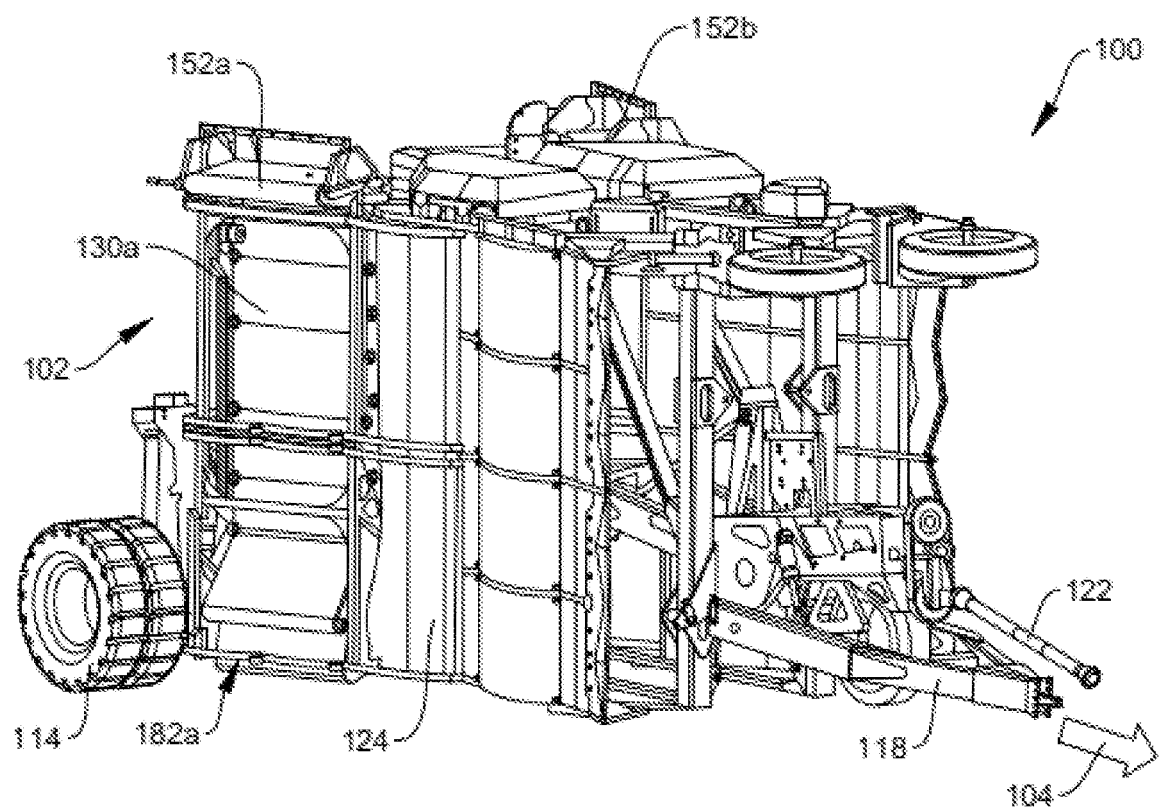
FIG. 11 is a perspective view of a harvester having a foldable rear cross in accordance with the present disclosure, with the harvester and the rear cross folded for transport on roadways.

The lifting actuators 208, 210 also allow the belt sections 130 to be lifted to a position suitable for transporting the harvester device 100 on roadways. Shown in FIG. 11 is a perspective view of the harvester 100 and the rear cross system 102 folded entirely upward for transport on roadways. This fully folded configuration is attained by fully extending the lifting actuators 208, 210 to cause the first and second belt sections 130*a, b* to be substantially vertically oriented. With reference to FIG. 8, full extension of the lifting actuators 208, 210 causes continued rotation of the belt sections 130*a, b* in the direction of arrows 214, causing the outboard ends 150 of the belt sections 130 to draw toward each other and the belt sections 130 to eventually become vertically oriented. As shown in FIG. 11, in the fully raised and folded position the outboard tip-downs 152 can be fully lowered, causing them to be substantially horizontal. This can help provide tension on the respective belt 130 during transport, to help reduce the effect of wind on the position of the belt. The belt tensioning mechanisms 182 can also be adjusted for this purpose.

With the harvester device 100 folded in the configuration of FIG. 11, the forward portion of the harvester 100 can be hitched to a towing vehicle via the hitch or drawbar 118. The rearward portion of the folded harvester is supported on the rear wheels 114, and thus the entire device can be easily towed on roadways to any desired location.

It will be apparent that the lengths of the belt sections 130 affect the overall width of the harvester device 100, and also relate to the height of the harvester device when folded as in FIG. 11. These dimensions can be selected within a wide range of useful dimensions. In one embodiment, the harvester 100 has an overall width of about 30 feet when in the operating configuration (e.g. as shown in FIGS. 1-3), the first and second belt sections 130 of the folding rear cross having a combined length of that amount. With this configuration, each belt section 130 has a length of about 15 feet, and the foldable belt sections 130 extend to a height of about 13 feet when the harvester 100 is in the fully upright folded position. This feature is advantageous for transport on roadways, where it is desirable that the harvester 100 have an overall height that provides adequate clearance under bridges, overhead wires, and other possible obstacles. It is generally desirable that this overall height be less than about fifteen feet.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A foldable rear cross system for a harvesting device having a harvesting direction and a discharge, comprising:
   first and second substantially linearly aligned reversible endless belt sections, disposed upon first and second moveable frame sections having inboard ends that are adjacent to each other when the frame sections are in an operational position, positioned near the discharge and oriented transverse to the harvesting direction,
   each endless belt section having
      a vertically moveable inboard end disposed at the inboard end of the respective frame section, in overlapping relationship with the inboard end of the other endless belt section when the frame sections are in the operational position; and
   a lifting device, attached to the first and second frame sections, configured to selectively lift and separate the frame sections from the operational position to a raised position in which the inboard ends of the first and second reversible endless belt sections are away from the overlapping relationship.

2. A foldable rear cross system in accordance with claim 1, wherein the vertically moveable inboard ends of the endless belt sections comprise a pivotal tip-down.

3. A foldable rear cross system in accordance with claim 2, wherein the belt sections each include an outboard end, adapted to allow discharge of product from the respective belt section to ground beside the harvester.

4. A foldable rear cross system in accordance with claim 3, wherein the outboard ends each have a selectively pivotal tip-down.

5. A foldable rear cross system in accordance with claim 1, wherein the first and second substantially linearly aligned reversible endless belt sections are rearwardly tilted.

6. A foldable rear cross system in accordance with claim 1, wherein the harvesting device is a root crop harvester.

7. A foldable rear cross system in accordance with claim 1, wherein the belt sections each include an outboard end, and further comprising a tipping mechanism, associated with each belt section, configured to selectively raise and lower the respective outboard ends, to selectively slope the belt sections toward left or right discharge directions.

8. A foldable rear cross system in accordance with claim 7, wherein the tipping mechanism comprises:
   a pivoting connection, pivotally attaching the inboard end of each belt section to the respective frame section, and
   a lifting mechanism, attaching the outboard end of each belt section to the support frame, the lifting mechanism configured to selectively raise and lower the outboard end of the respective belt section.

9. A foldable rear cross system in accordance with claim 1, wherein the first and second belt sections have a combined length of thirty feet.

10. A foldable rear cross system in accordance with claim 9, wherein the lifting device is further configured to selectively lift the first and second frame sections to a fully upright folded position for transport of the harvester.

11. A root crop harvester, comprising:
    a foldable frame, having wheels, configured to be moved upon ground in a harvesting direction;
    a foldable crop extracting mechanism, having a discharge, attached to the frame; and
    a foldable rear cross conveyor mechanism, oriented generally transverse to the harvesting direction, positioned to receive harvested crops from the discharge and transport and discharge the harvested crops laterally, the foldable rear cross further comprising:
       first and second foldable frame sections, having inboard ends that are adjacent to each other when in an operational position;
       first and second reversible endless belt devices, disposed upon the first and second frame sections, respectively, each having an inboard end and an outboard end and disposed end-to-end near the discharge, the inboard ends being vertically moveable and disposed at the inboard ends of the respective frame sections in an overlapping relationship when the frame sections are in the operational position; and
       a lifting device, configured to selectively lift and fold the frame, the crop extracting mechanism and the frame sections from the operational position to a raised position, wherein the inboard ends of the belt devices are removed from the overlapping relationship to a position in which the overlapping relationship can be reversed.

12. A foldable rear cross system in accordance with claim 11, wherein the vertically moveable inboard ends comprise a pivotal tip-down, the overlapping relationship of the inboard ends of the first and second belt devices comprising the inboard tip-down of one of the first and second belt devices being positioned above the inboard tip-down of the other of the first and second belt devices.

13. A foldable rear cross system in accordance with claim 11, wherein the first and second reversible endless belt devices are rearwardly tilted.

14. A foldable rear cross system in accordance with claim 11, wherein the first and second endless belt devices have a combined length of thirty feet when in a substantially horizontal operating position, and the lifting device is further configured to lift and fold the frame sections to a fully upright folded position.

15. A foldable rear cross system in accordance with claim 11, further comprising a tipping mechanism for selectively sloping the endless belt devices toward left or right discharge directions.

16. A foldable rear cross system for a harvesting device having a harvesting direction and a discharge, comprising:
    first and second moveable frame sections, having inboard ends, supporting first and second reversible endless belt devices, respectively, oriented generally transverse to the harvesting direction, positioned to receive harvested crops from the discharge and transport and discharge the harvested crops laterally, each endless belt device having an inboard end and an outboard end and disposed end-to-end near the discharge, the inboard ends being vertically moveable and disposed at the inboard ends of the respective frame sections in an overlapping relationship when the first and second moveable frame sections are adjacently disposed in an operational position; and
    a lifting device, configured to selectively lift and separate the first and second moveable frame sections, to allow reversal of the overlapping relationship.

17. A foldable rear cross system in accordance with claim 16, wherein the vertically moveable inboard ends of the first and second reversible endless belt devices comprise a pivotal tip-down, the overlapping relationship comprising the inboard tip-down of one of the first and second belt devices being positioned above the inboard tip-down of the other of the first and second belt devices.

18. A foldable rear cross system in accordance with claim 16, wherein the outboard ends have selectively pivotal tip-downs.

19. A foldable rear cross system in accordance with claim 16, further comprising a tipping mechanism configured for independently selectively sloping the first and second reversible endless belt devices toward left or right discharge directions.

20. A foldable rear cross system in accordance with claim 16, wherein the first and second belt sections have a combined length of thirty feet, and the foldable belt sections extend to a height of less than fifteen feet when in a fully upright folded position.

\* \* \* \* \*